J. F. STRANAHAN.
RESILIENT TIRE.
APPLICATION FILED DEC. 7, 1920.
1,399,670.
Patented Dec. 6, 1921.
2 SHEETS—SHEET 1.
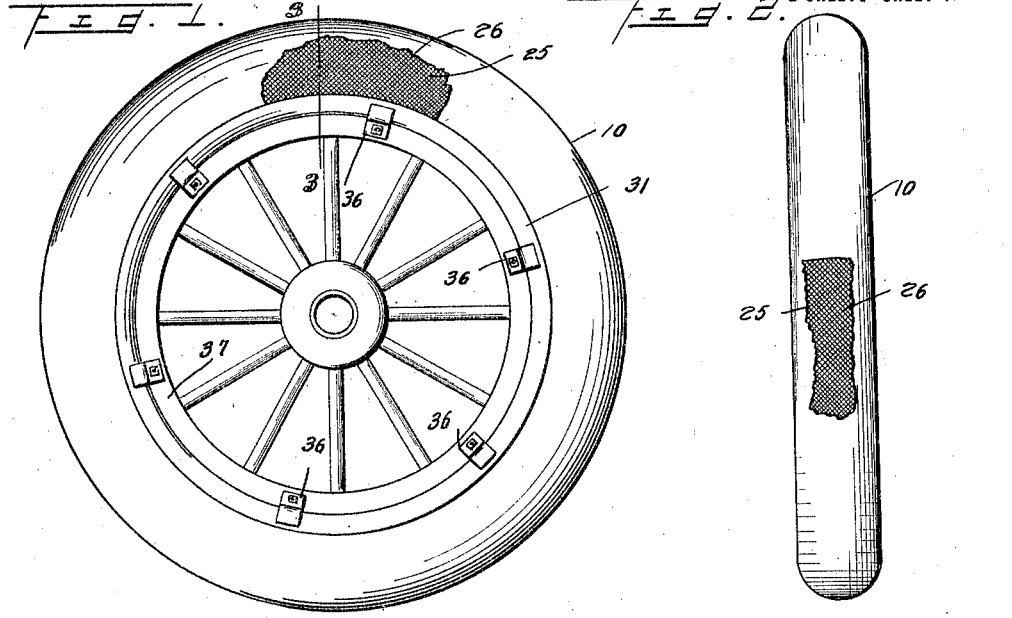
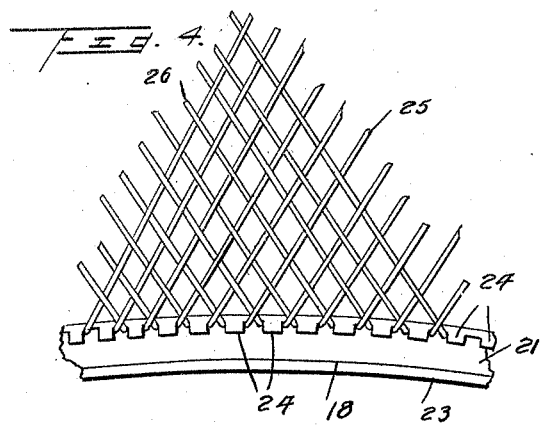
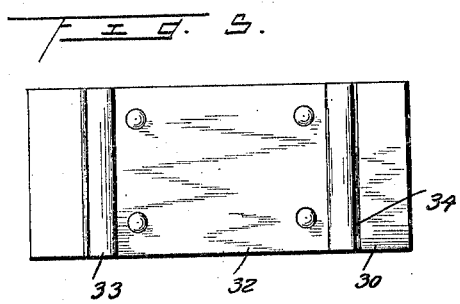
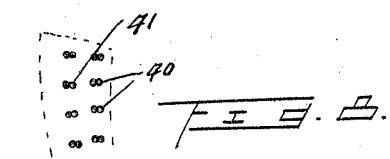
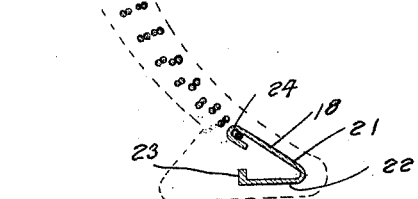
Inventor
J. F. Stranahan.
Attorney J. F. STRANAHAN.
RESILIENT TIRE.
APPLICATION FILED DEC. 7, 1920.
1,399,670.
Patented Dec. 6, 1921.
2 SHEETS—SHEET 2.
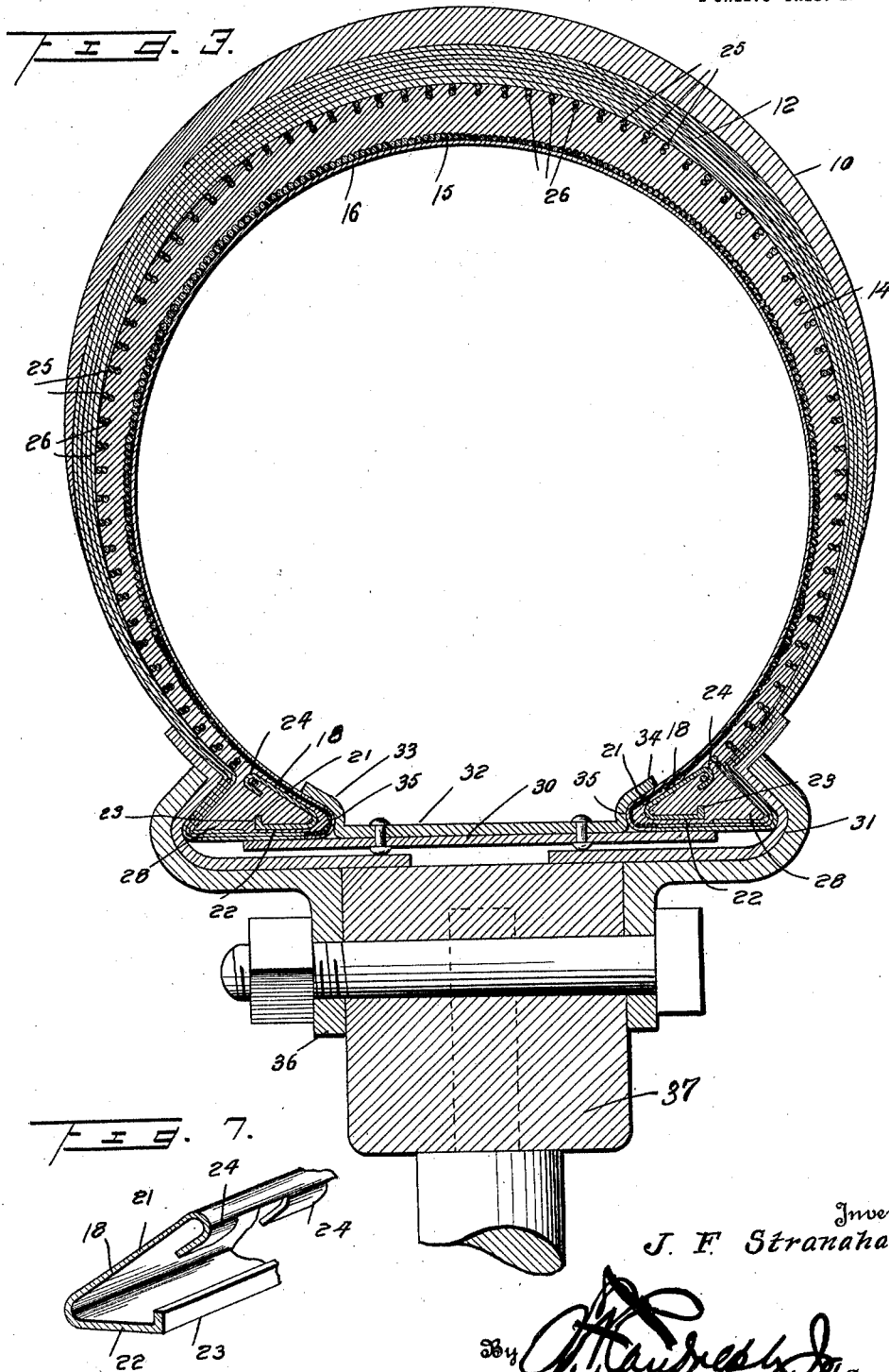
Inventor
J. F. Stranahan.

UNITED STATES PATENT OFFICE.

JAMES F. STRANAHAN, OF PITTSBURG, CALIFORNIA, ASSIGNOR OF ONE-HALF TO JOHN F. MORA, OF PITTSBURG, CALIFORNIA.

RESILIENT TIRE.

1,399,670.   Specification of Letters Patent.   Patented Dec. 6, 1921.

Application filed December 7, 1920. Serial No. 422,996.

*To all whom it may concern:*

Be it known that I, JAMES F. STRANAHAN, a citizen of the United States, residing at Pittsburg, in the county of Contra Costa and State of California, have invented certain new and useful Improvements in a Resilient Tire; and I do hereby declare the following to be a full, clear, and exact description of the invention, such as will enable others skilled in the art to which it appertains to make and use the same.

This invention relates to a resilient tire, and the object is to provide a tire of such construction that the necessity of employing an inner tube, or pneumatic tube, is obviated, the tire *per se* providing the necessary resiliency.

A further object is to provide a tire of the type indicated, which may be so constructed by employing materials of the required strength that it will be suitable for all sizes and makes of motor vehicles.

A still further object is to provide for increasing the strength of the tire in proportion to the load to be carried, by employing a wire structure having certain novel characteristics which permit of the distribution of the load in a highly efficient manner, and which at the same time provides the proper degree of resiliency and tractive power.

A still further object is to provide particular means for mounting or securing the wire structure.

A still further object is to provide, in connection with the foregoing, an outer layer of rubber, a body of rubber intimately associated with the wire structure, a sufficient number of layers of canvas, and a binding or reinforcing layer of cord.

With the foregoing and other objects in view, the invention consists in the novel construction, combination, and arrangement of elements hereinafter described and claimed, it being understood that modifications or variations in construction may be made within the scope of the claims, without departing from the spirit of the invention.

In the accompanying drawings:

Figure 1 is a view in side elevation of a wheel equipped with a tire and rim embodying my invention, a part of the tire being broken away to illustrate the wire mesh of my invention.

Fig. 2 is a view in edge elevation of the tire, a part thereof being broken away to show the wire mesh.

Fig. 3 is a sectional view taken on the line 3—3 of Fig. 1, on a larger scale.

Fig. 4 is a detail view of fragmentary portions of the wire mesh and one of the annular elements.

Fig. 5 is a detail view of one of the spreading devices.

Fig. 6 is a longitudinal sectional view of the spreading device.

Fig. 7 is a perspective view of a fragmentary portion of one of the annular elements, and Fig. 8 is a view illustrating a slight modification in the mesh.

The tread *per se* is designated 10, being of solid rubber, and within this portion are a suitable number of layers of canvas, shown at 12. A body of rubber 14 is intimately associated with the structure of wire mesh, and is vulcanized thereto, and adjacent to the inner surface of the body 14 are the cords 15, and another layer of canvas 16 constitutes the inner member of the tire.

One of the most important features of the construction is that involving the wire mesh, the mounting means therefor, and the body of rubber 14 in which the mesh and mounting means are embedded.

Oppositely located annular elements 18 each comprise a portion 21, a portion 22 extending at an acute angle with reference to portion 21, forming a type of channel member, V-shaped in cross section, and the element 22 having an offset flange 23. A series of teeth 24 is provided on the free edge of member 21. These teeth are of hook form and engage the selvage of the embedded reinforcement by having the strands 25 and 26 thereof looped therearound. (Fig. 4).

The mesh comprises a plurality of wires 25 extending obliquely, and a plurality of wires 26 extending obliquely in another direction, and passing around the tire. The particular angle at which the series 25 and 26, or the wires of these series, intersect, is determined by the type of tire to be produced, and the degree of resiliency required.

The thickness of the tire is gradually reduced near the edge portions, and at the edges *per se* an enlarged portion 28 is molded for embedding the elements 18 and providing the necessary flanges.

Spreading devices are provided at suitable intervals and each include a plate 30 adapted to lie adjacent to the rim 31, and further include engaging devices 32, riveted to elements 30 and having the flared portions 33 and 34. The V-shaped channels 35 are thus provided for receiving the edge portions of the tires. The usual lugs, or securing devices for the tire, are shown at 36, and the felly of the wheel is designated at 37. The wire may be of brass or steel, the gage in a given instance depending upon the size of the tire and the work which it is intended to perform.

In Fig. 8 I have shown a second layer of wire mesh, the rubber being vulcanized around the two layers, here designated 40 and 41. This structure is employed in tires designated for unusually heavy loads.

Having thus described the invention, what I claim is:

1. A tire open upon its inner side and having thickened portions at the edges bordering upon the opening to form flanges, annular members embedded in the flanges, each member comprising portions disposed relatively at an acute angle to each other, one of said portions having hooks along its free edge, and an embedded reinforcement having its selvage engaged with the said hooks.

2. A tire open upon its inner side and having thickened portions at the edges bordering upon the opening to form flanges, annular members embedded in the flanges, each member comprising portions disposed relatively at an acute angle to each other, one of said portions having hooks along its free edge, and the other portion having its free edge offset, and a mesh reinforcement embedded in the tire and comprising obliquely disposed wires looped about the hooks of the said annular members.

3. A tire comprising an inner layer of fabric, a series of cords, a body of rubber, a metallic reinforcing structure for the latter comprising separate series of wires extending obliquely around the tire in two directions, spaced annular elements to which the wires are secured, said elements being embedded in the rubber, a layer of fabric, and a tread portion for the tire.

4. A tire comprising a series of wires extending obliquely around the tire in a given direction, a series extending obliquely around the tire in another direction, spaced annular elements for securing the individual wires, and spacing elements for the annular elements, each of the spacing elements including a plate for contact with a wheel rim, and flared engaging devices connected with the plate and positioned for contact with the inner portion of the tire at the edges thereof.

In testimony whereof I affix my signature in presence of two witnesses.

JAMES F. STRANAHAN.

Witnesses:
WADE W. MOORE,
GEO. T. OLIVER.